United States Patent
Hashimoto

(10) Patent No.: US 10,668,488 B2
(45) Date of Patent: Jun. 2, 2020

(54) CYCLONE DUST COLLECTOR

(71) Applicant: TRINITY INDUSTRIAL CORPORATION, Toyota-shi, Aichi (JP)

(72) Inventor: Takashi Hashimoto, Nagoya (JP)

(73) Assignee: TRINITY INDUSTRIAL CORPORATION, Toyota-shi (JP)

( * ) Notice: Subject to any disclaimer, the term of this patent is extended or adjusted under 35 U.S.C. 154(b) by 218 days.

(21) Appl. No.: 15/896,146

(22) Filed: Feb. 14, 2018

(65) Prior Publication Data

US 2018/0243760 A1 Aug. 30, 2018

(30) Foreign Application Priority Data

Feb. 27, 2017 (JP) ................................ 2017-034686
Feb. 27, 2017 (JP) ................................ 2017-034687

(51) Int. Cl.

| B01D 47/00 | (2006.01) |
|---|---|
| B01F 3/04 | (2006.01) |
| B04C 9/00 | (2006.01) |
| B04C 3/00 | (2006.01) |
| B01D 45/16 | (2006.01) |
| B01D 47/06 | (2006.01) |

(52) U.S. Cl.
CPC ............... *B04C 9/00* (2013.01); *B01D 45/16* (2013.01); *B01D 47/06* (2013.01); *B01F 3/04049* (2013.01); *B01F 3/04078* (2013.01); *B04C 3/00* (2013.01); *B04C 2003/003* (2013.01); *B04C 2003/006* (2013.01); *B04C 2009/008* (2013.01)

(58) Field of Classification Search
CPC .... B01F 3/04; B01F 3/04049; B01F 3/04078; B01D 47/00; B01D 47/06; B01D 53/78
USPC .......................................... 96/314, 316, 319
See application file for complete search history.

(56) References Cited

U.S. PATENT DOCUMENTS

| 8,128,071 B2 | 3/2012 | Laslo |
|---|---|---|
| 9,744,612 B2 | 8/2017 | Hiyama et al. |
| 9,744,613 B2 | 8/2017 | Hiyama et al. |

FOREIGN PATENT DOCUMENTS

| CN | 2510149 Y | 9/2002 | |
|---|---|---|---|
| CN | 101522284 A | 9/2009 | |
| CN | 201329248 Y | * 10/2009 | ............. B01D 53/78 |
| CN | 104324574 A | 2/2015 | |
| CN | 105682841 A | 6/2016 | |
| JP | 3827243 B1 | 9/2006 | |
| JP | 2015-020129 A | 2/2015 | |

OTHER PUBLICATIONS

Feb. 3, 2020 Office Action issued in Chinese Patent Application No. 201810120120.3.

* cited by examiner

*Primary Examiner* — Robert A Hopkins
(74) *Attorney, Agent, or Firm* — Oliff PLC

(57) ABSTRACT

Provided is a cyclone dust collector with a higher particle collection efficiency than before. The cyclone dust collector of the present invention includes a nozzle assembly including a plurality of the nozzles arranged within a first cross section defined by a plane containing a center axis of the cylindrical case and part of the spiral flow path intersecting with each other, the nozzles being adapted to spray the water mist in a direction along the first cross section.

7 Claims, 9 Drawing Sheets

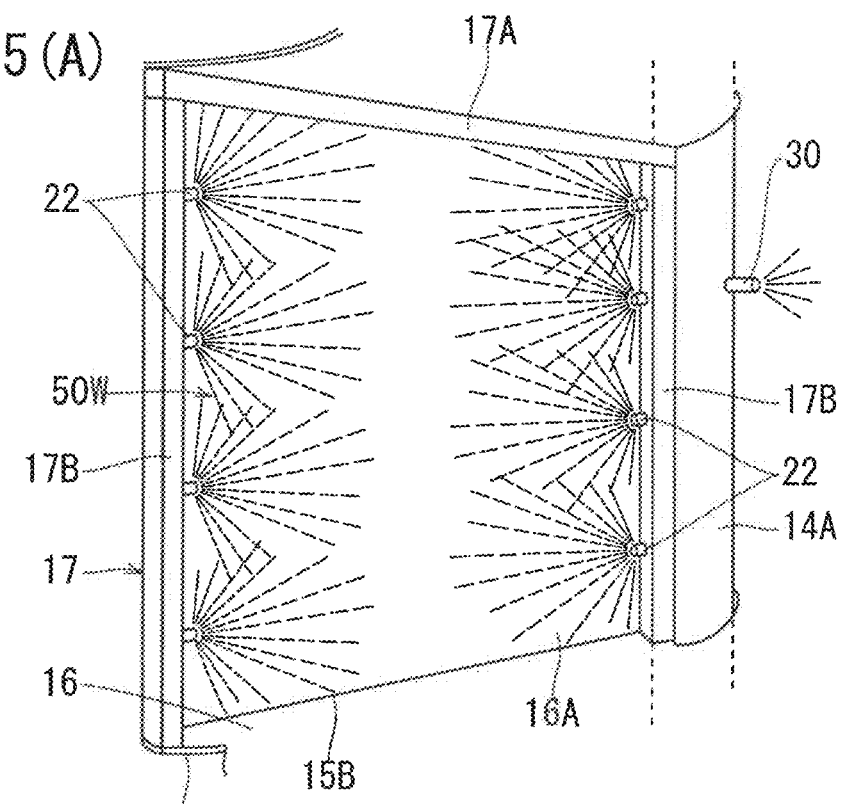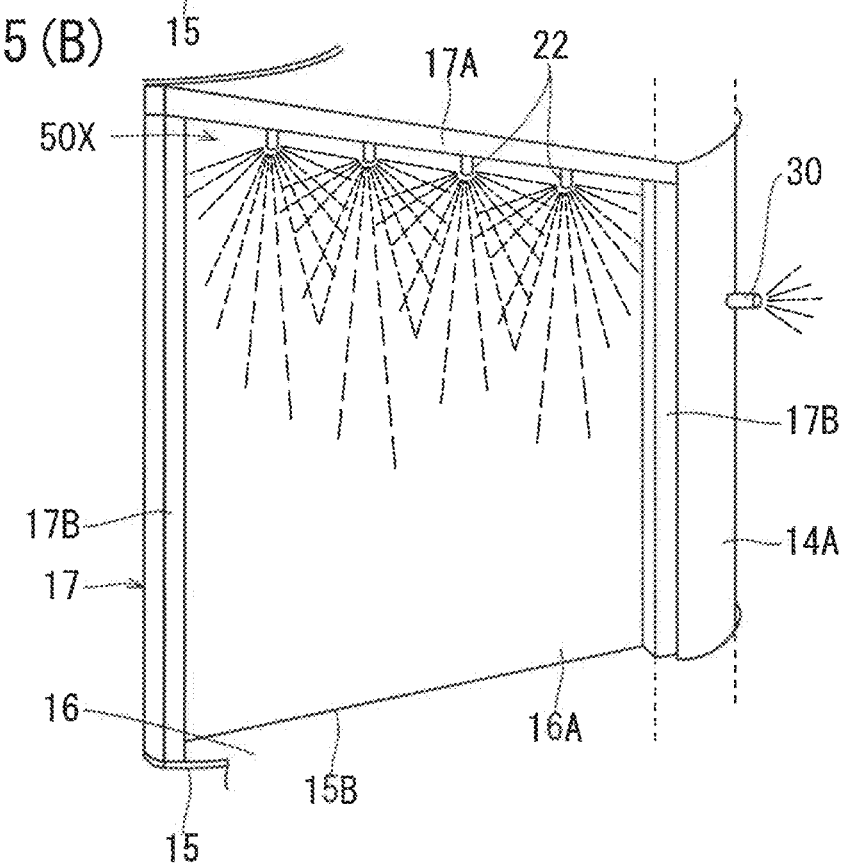

CYCLONE DUST COLLECTOR

BACKGROUND OF THE INVENTION

Field of the Invention

The present invention relates to a cyclone dust collector, which includes, inside a cylindrical case, a spiral flow path defined by a spiral guide and a nozzle that sprays water mist, to combine particles to be removed that are contained in an air passing through the spiral flow path with the water mist and to centrifugally collect the particles on an inner surface of the cylindrical case.

Description of the Related Art

As a cyclone dust collector of this type, one that includes a plurality of spray nozzles dispersedly arranged in a regular pattern along a spiral flow path has been known before (see, for example, FIG. 2 of Japanese Patent Application Publication No. 2015-020129A).

SUMMARY OF THE INVENTION

Problems to be Solved by the Invention

However, the particle collection efficiency of the cyclone dust collector described above is not high enough, and the improvement thereof has been desired.

The present invention was made in view of the circumstance described above and it is an object of the invention to provide a cyclone dust collector with a higher particle collection efficiency than before.

The cyclone dust collector according to one aspect of the present invention made to achieve the object noted above includes, inside a cylindrical case, a spiral flow path defined by a spiral guide and a nozzle that sprays water mist, to combine particles to be removed that are contained in an air passing through the spiral flow path with the water mist and to centrifugally collect the particles on an inner surface of the cylindrical case for recovery. The cyclone dust collector includes a nozzle assembly having a plurality of the nozzles arranged within a vertical cross section defined by a plane containing a center axis of the cylindrical case and part of the spiral flow path intersecting with each other, the nozzles spraying the water mist within the vertical cross section.

BRIEF DESCRIPTION OF DRAWINGS

FIG. 5(A) and FIG. 5(B) are perspective views of constricted part forming members according to a third embodiment;

DESCRIPTION OF THE EMBODIMENTS

First Embodiment

Hereinafter, a first embodiment of the present invention will be described with reference to FIG. 1 to FIG. 3. The cyclone dust collector 10 of this embodiment is used for purifying the air exhausted from a coating booth (not shown). Inside the coating booth, a coating robot performs coating by spraying atomized paint (hereinafter referred to as "paint mist") to a workpiece. The ceiling of the coating booth is in the form of mesh, while the floor takes the form of duckboards. The space beneath the floor is divided into upper and lower halves by an intermediate plate, which has a plurality of through holes, and holds water on the intermediate plate. The air flowing down from the entire ceiling travels down below the floor with the unused paint mist. Part of the paint mist is captured in the water on the intermediate plate, while the air containing the rest of the paint mist is discharged into a gas and liquid exhaust duct 11 extending substantially horizontally from the compartment below the intermediate plate. The water on the intermediate plate also drops down through the through holes and flows into the gas and liquid exhaust duct 11 below.

Figure 1:
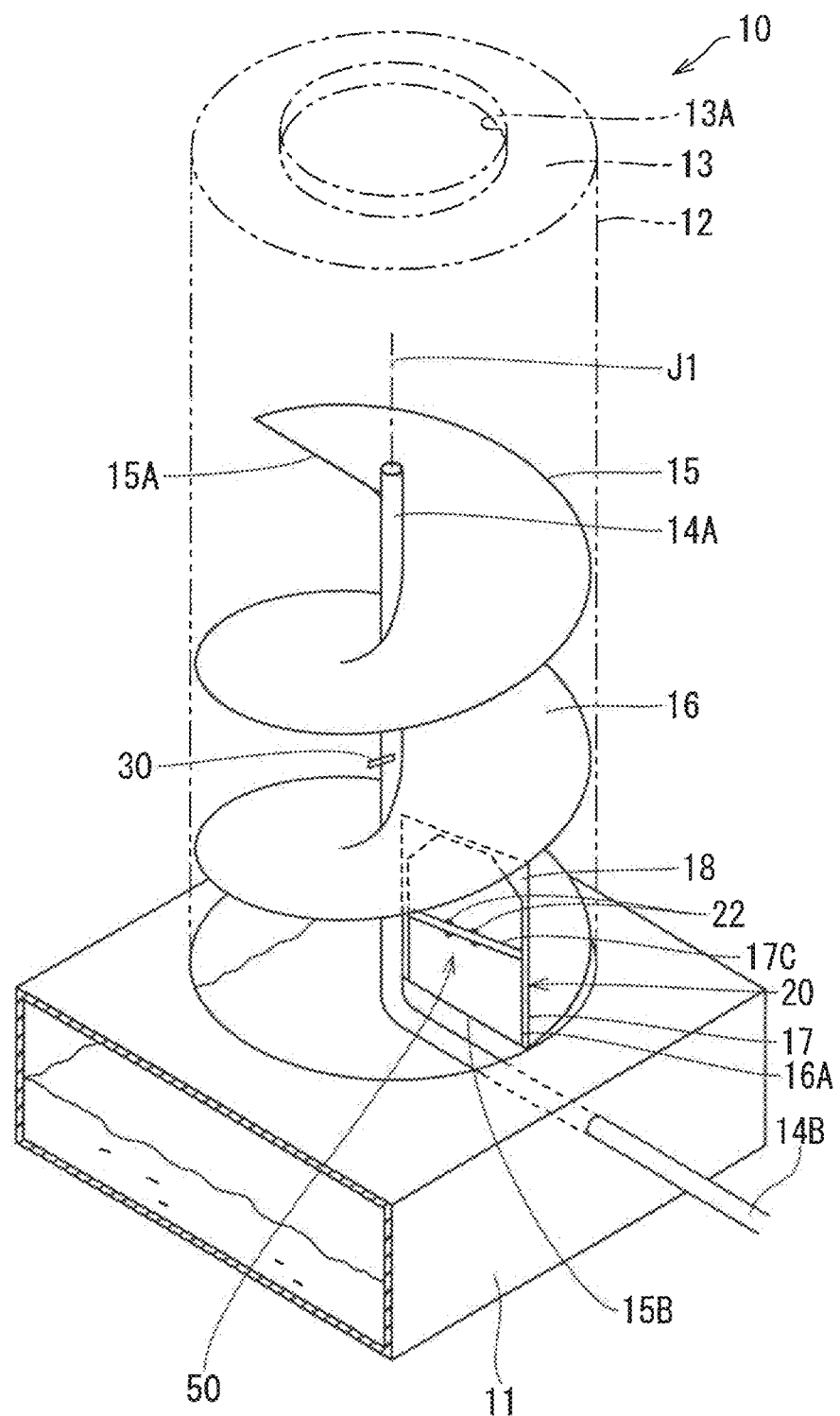
FIG. 1 is a perspective view of a cyclone dust collector according to a first embodiment of the present invention.

As shown in FIG. 1, the cyclone dust collector 10 of this embodiment includes a cylindrical case 12 that stands upright on a distal end part of the gas and liquid exhaust duct 11. The lower end of the cylindrical case 12 is open and communicates with the interior of the gas and liquid exhaust duct 11. A ring-shaped inward flange 13 extending inward is provided to the upper end of the cylindrical case 12, and the inside of this inward flange 13 serves as an exhaust port 13A of the cyclone dust collector 10. The air containing paint mist flows into the cylindrical case 12 from its lower end, and the air from which the paint mist has been removed flows out from the exhaust port 13A at the upper end. In this embodiment, the paint mist particles contained in this air corresponds to the "particles to be removed" according to the present invention.

A center pillar 14A is provided in a central part of the cylindrical case 12. The center pillar 14A has a pipe structure and extends from the lower end of the cylindrical case 12 to a position near the upper end of the cylindrical case, and is closed at the upper end. A water distribution pipe 14B extends through one side face of the gas and liquid exhaust duct 11 at a position closer to the upper end. A distal end portion of the water distribution pipe 14B is connected to the lower end of the center pillar 14A. A pump (not shown) supplies water to the center pillar 14A via the water distribution pipe 14B. In this embodiment, the center pillar 14A has a structure of pipe and is used for supplying water, however, the center pillar 14A may have a solid structure and a water supply pipe may be laid along an outer surface of the center pillar 14A.

The cylindrical case 12 accommodates a spiral guide 15. The spiral guide 15 extends helically around the center pillar 14A about two and a half turns, for example. Outer edges of the spiral guide 15 contact an inner surface of the cylindrical case 12, so that a spiral flow path 16 is formed inside the cylindrical case 12. An upper end edge 15A of the spiral guide 15 is located closer to the upper end of the cylindrical case 12. A lower end edge 15B of the spiral guide 15 is positioned within an opening plane of the lower end of the cylindrical case 12, and extends in a direction orthogonal to the air flow direction (i.e., width direction) in the gas and liquid exhaust duct 11. The lower part of the spiral guide 15 is inclined gradually upward from the lower end edge 15B in the air flow direction in the gas and liquid exhaust duct 11.

A constricted part forming member 20 is mounted in an upstream end portion of the spiral flow path 16. The constricted part forming member 20 includes a support frame 17 fitted to the upstream end portion of the spiral flow path 16. More specifically, the support frame 17 is arranged within a vertical cross section 16A (corresponding to a first cross section of the present invention), which is defined by a plane containing the center axis J1 of the cylindrical case 12 and the lower end edge 15B of the spiral guide 15, and the upstream end portion of the spiral flow path 16 intersecting with the plane.

Figure 2:
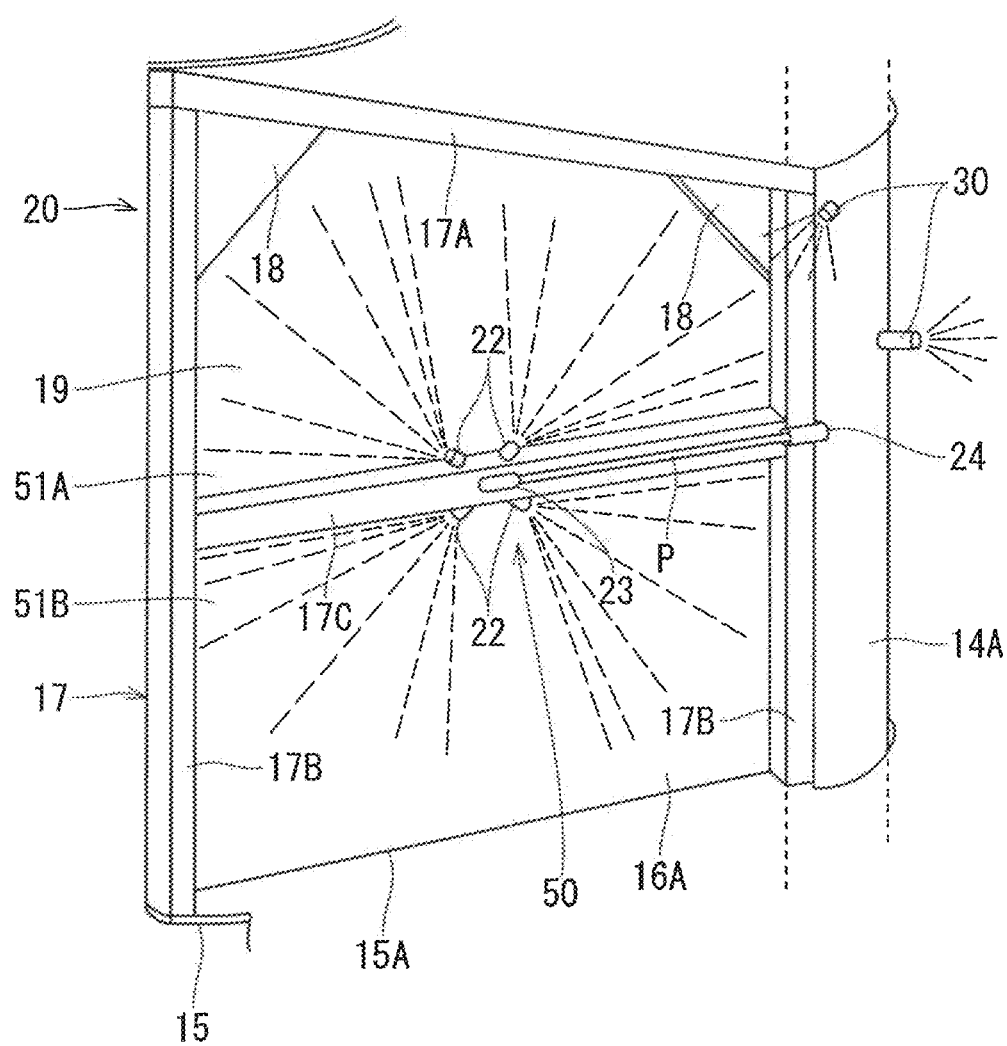
FIG. 2 is a perspective view of a constricted part forming member.
Figure 3:
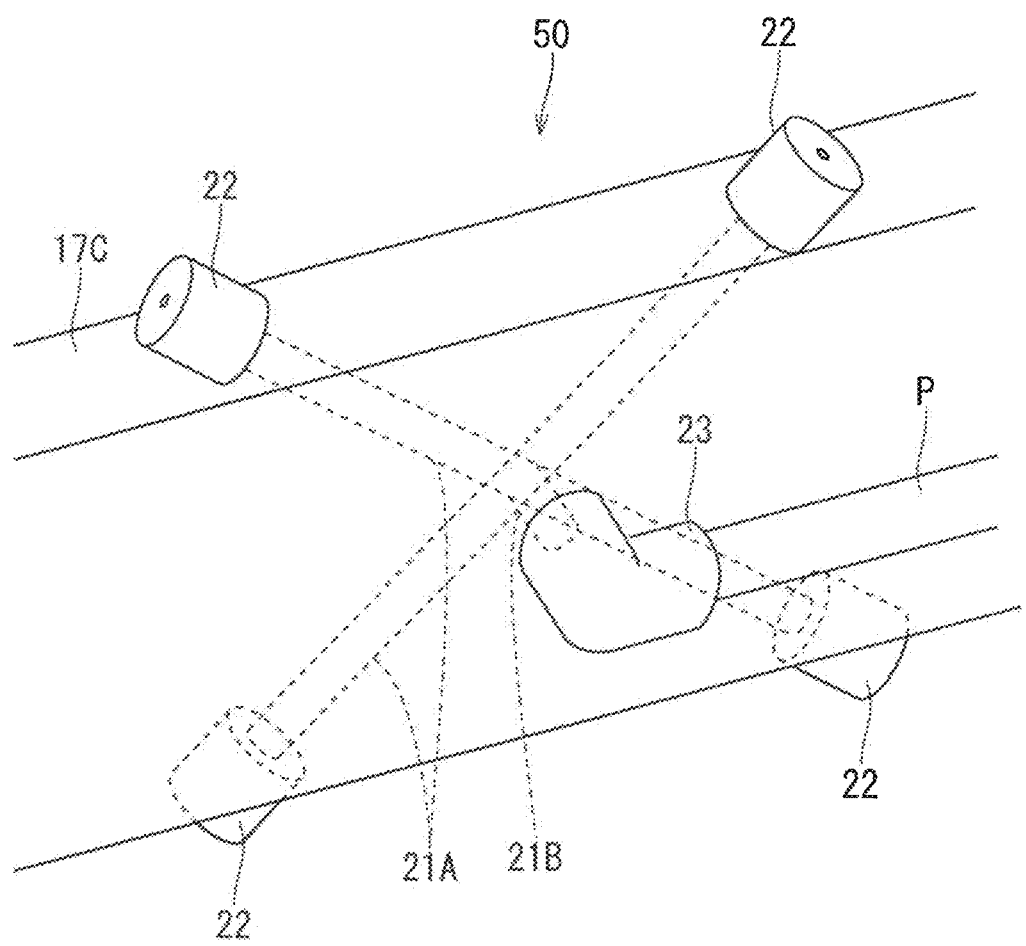
FIG. 3 is a partially enlarged perspective view of a nozzle assembly.

As shown in FIG. 2, the support frame 17 is structured such that a pair of legs 17B extending in an up and down direction along both side edges of the vertical cross section 16A are connected at their upper ends by an upper end bridge 17A extending along the upper edge of the vertical cross section 16A, with an intermediate bridge 17C connecting portions substantially in the center in the up and down direction of the pair of legs 17B. One of the legs 17B is fixedly screwed to the center pillar 14A, while the other leg 17B is fixedly screwed to the cylindrical case 12. The upper end bridge 17A is in contact with the lower face of the spiral guide 15 thereabove. The intermediate bridge 17C further divides the vertical cross section 16A into a pair of split regions 51A and 51B. Screw holes in the center pillar 14A for fixing the leg 17B are formed such as not to extend through, or tightly sealed with a sealing material. In this embodiment, the intermediate bridge 17C corresponds to a partition bar according to the present invention.

Triangular ribs 18 (corresponding to an inner wall of the present invention) are fixed to both corners on the upper side of the support frame 17. The support frame 17 and triangular ribs 18 make the starting end of the spiral flow path 16 narrower and thus a constricted part 19 is formed.

In a central part of the longitudinal direction of the intermediate bridge 17C are provided four nozzles 22 spraying water mist radially inside the constricted part 19 and constituting a nozzle assembly 50. More specifically, as shown in FIG. 3, a pair of through holes 21A that are inclined at 45° to the up and down direction and orthogonal to each other, for example, extend through in the intermediate bridge 17C. Spray nozzles 22 are screwed in both ends of the through holes 21A. A communication hole 21B extends from the intersecting portion of both the through holes 21A to the back side of the intermediate bridge 17C, and an elbow joint 23 is attached to the rear end opening of this communication hole 21B. As shown in FIG. 2, a through hole is formed in the center pillar 14A at a position opposite the elbow joint 23, and a straight joint 24 is attached thereto. The elbow joint 23 and the straight joint 24 are connected to each other with a pipe P. Water is thus supplied collectively from the center pillar 14A to the four nozzles 22, from which water mist is sprayed radially.

Through holes are formed, with nozzles 30 screwed therein, at positions in the middle between the spiral guides above and below, at three locations of the center pillar 14A, 90° helically advanced from the constricted part 19 along the spiral flow path 16, 180° advanced from there, and 180° advanced further from there. A through hole is formed in the center pillar 14A also at the back of one triangular rib 18, with a nozzle 30 being screwed therein. Water inside the center pillar 14A is sprayed toward the inner surface of the cylindrical case 12 from each of the nozzles 30.

The structure of the cyclone dust collector 10 of this embodiment is as described above. Next, the advantageous effects of this cyclone dust collector 10 will be described. The air containing the paint mist and discharged from the coating booth flows into the cylindrical case 12 of the cyclone dust collector 10 through the gas and liquid exhaust duct 11. Water mist is sprayed toward the air inside the cylindrical case 12. The air containing the water mist and the paint mist moves up spirally along the spiral flow path 16. Particles other than the gas molecules in the air are collected on the inner surface of the cylindrical case 12 by the centrifugal force of this spiral movement. The heavier the particles are, the more easily they are collected on the inner surface of the cylindrical case 12, as they are subjected to a larger centrifugal force. Therefore, to remove the paint mist, it is favorable that paint mist particles and water mist particles combine to grow larger.

If the cyclone dust collector 10 has a structure similar to conventional ones in which a plurality of nozzles are dispersed in a regular pattern along the spiral flow path 16, the water mist particles cannot be distributed to the entire air and sufficiently mixed with the paint mist. Since the air flows in a laminar way inside the spiral flow path 16, the separate paint mist and water mist do not sufficiently mix with each other as they travel downstream. The paint mist particles and the water mist particles hardly join each other, which results in a lower paint mist particle collection efficiency.

On the other hand, the cyclone dust collector 10 of this embodiment includes the constricted part forming member 20 and the nozzle assembly 50. As shown in FIG. 2, the vertical cross section 16A is divided by the intermediate bridge 17C of the constricted part forming member 20 into two, upper and lower, split regions 51A and 51B, and the four nozzles 22 constituting the nozzle assembly 50 are separately assigned to substantially the left half and right half areas of the upper split region 51A and substantially the left half and right half areas of the lower split region 51B for spraying water mist in each assigned area. Namely, the plurality of nozzles 22 can cooperatively spray the water mist substantially over the entire vertical cross section 16A of the spiral flow path 16. This way, as compared to conventional structures in which a plurality of nozzles are distributed in a regular pattern along the spiral flow path 16, the amount of air that passes through the nozzles without being hit by the water mist can be reduced, and the mixing rate of the particles to be removed in the air and the water mist particles can be raised.

The nozzle assembly 50 is arranged at an upstream end portion of the spiral flow path 16 and the water mist and the paint mist are mixed together at an early stage of passage of the air through the spiral flow path 16. The provision of the constricted part forming member 20 further creates turbulence in the air to facilitate the mixing. Since the constricted part forming member 20 makes the vertical cross section 16A of the spiral flow path 16 narrower to form the constricted part 19 so that the air passage area is smaller there than other parts, the water mist can readily be distributed over the entire vertical cross section 16A. According to a simulation as will be described later, the water mist can hardly reach corners of the spiral flow path 16. In the cyclone dust collector 10 of this embodiment, triangular ribs 18 are arranged at the corners of the vertical cross section 16A to reduce areas hardly reached by the water mist, so that the mixing rate of the paint mist particles and the water mist particles can be raised efficiently.

As described above, with the cyclone dust collector 10 of this embodiment, the mixing rate of the paint mist particles and the water mist particles is raised, so that the particles to be removed and water mist particles can join each other more easily and the collection efficiency of particles to be removed is improved than before.

The plurality of nozzles 22 and 30 inside the cylindrical case 12 are all located closer to the upstream side of the spiral flow path 16, so that less water mist is discharged to the outside of the cyclone dust collector 10. This can reduce the possibility of corrosion or water leakage of the ducts and exhaust fans arranged in the exhaust path of the air released from the cyclone dust collector 10. Moreover, this cyclone dust collector 10 allows the constricted part forming member 20 to be removed for easy cleaning of the interior.

Part of the air exhausted from the exhaust port 13 of the cyclone dust collector 10 is released to the atmosphere, while the rest is fed back to the coating booth for reuse after its moisture and temperature are adjusted by known equipment. The water discharged from the coating booth to the gas and liquid exhaust duct 11 is purified by known equipment and fed to the coating booth, or delivered from the water distribution pipe 14B to the center pillar 14A to be reused.

Second Embodiment

Figure 4:
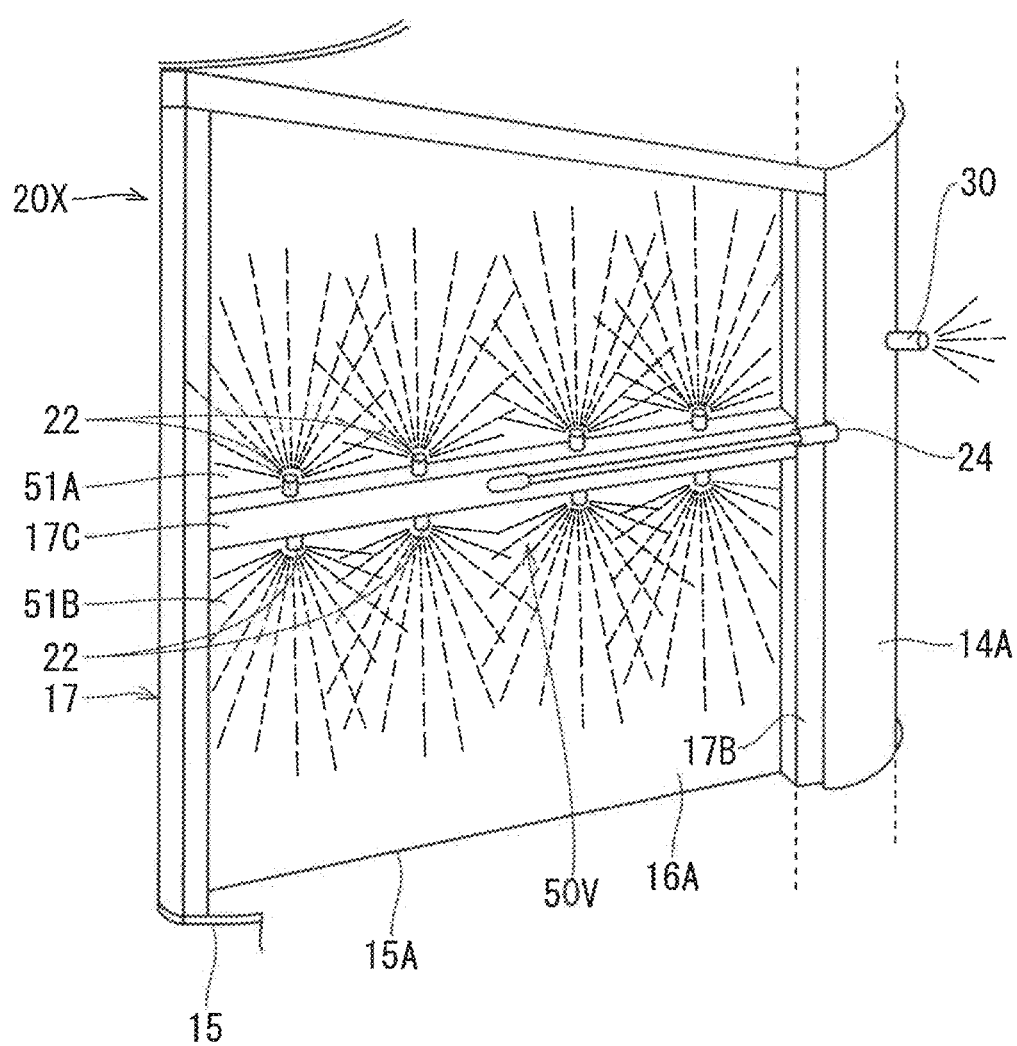
FIG. 4 is a perspective view of a constricted part forming member according to a second embodiment.

This embodiment is illustrated in FIG. 4, and different from the first embodiment in the configuration of a constricted part forming member 20X. More specifically, the triangular ribs 18 are removed from the constricted part forming member 20 of the above-described first embodiment in the constricted part forming member 20X. The constricted part forming member 20X includes a nozzle assembly 50V having a plurality of nozzles 22 each on the upper face and lower face of the intermediate bridge 17C. The plurality of nozzles 22 on the upper face of the intermediate bridge 17C spray water mist upward, while the plurality of nozzles 22 on the lower face of the intermediate bridge 17C spray water mist downward. The configuration of this embodiment also provides the advantageous effects similar to those of the first embodiment.

Third Embodiment

This embodiment is shown in FIG. 5(A), and configured by removing the intermediate bridge 17C from the above-described second embodiment, with a nozzle assembly 50W having a plurality of vertically aligned nozzles 22 each on the opposite faces of the pair of legs 17B. The nozzles 22 spray water mist in opposite directions from each of the legs 17B. The configuration of this embodiment also provides the advantageous effects similar to those of the first embodiment.

Instead of arranging the plurality of nozzles 22 on the legs 17B of the support frame 17 as described above, a plurality of nozzles 22 may be arranged on the upper end bridge 17A of the support frame 17 as in a nozzle assembly 50X shown in FIG. 5(B) so that water mist is sprayed toward the spiral flow path 16 only from above.

Fourth Embodiment

Figure 6:
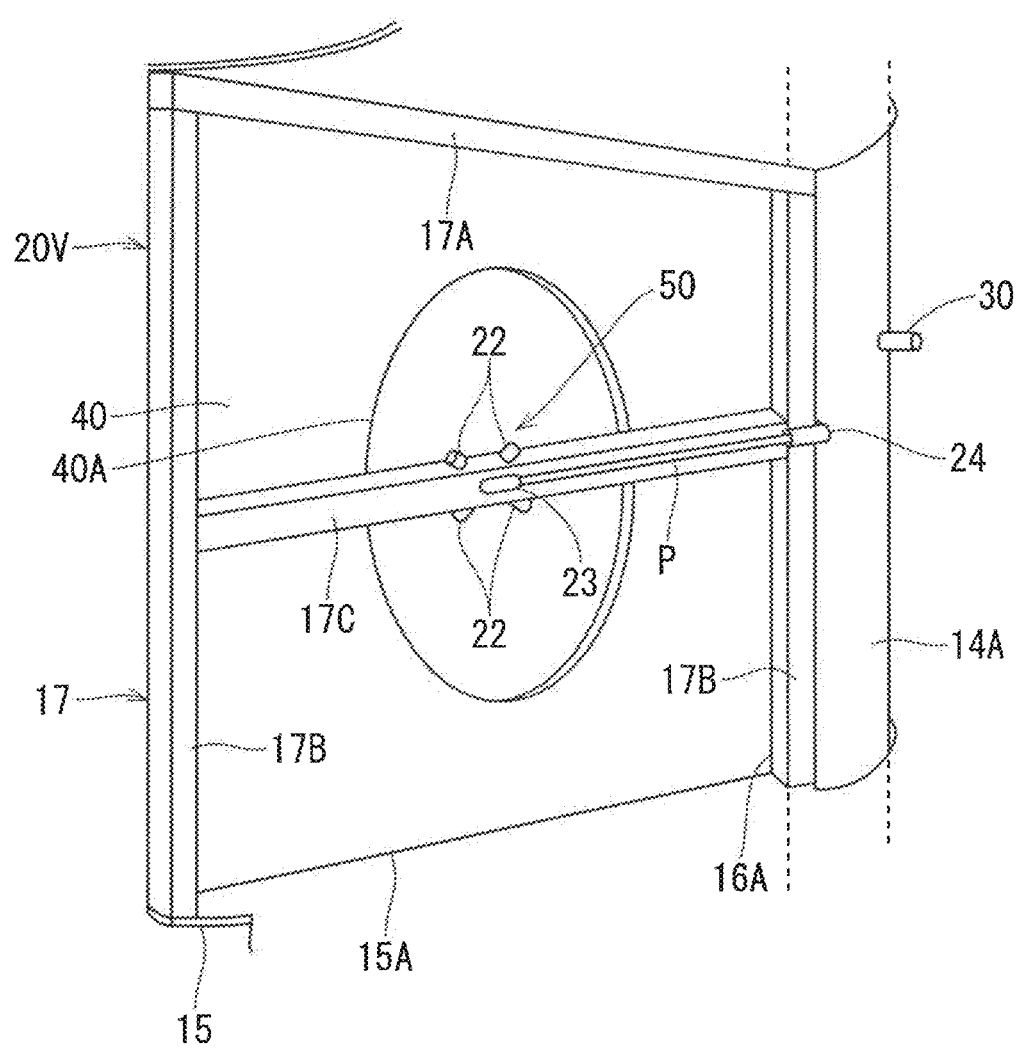
FIG. 6 is a perspective view of a constricted part forming member according to a fourth embodiment.

This embodiment is illustrated in FIG. 6, and different from the first embodiment in the configuration of the constricted part forming member 20V. More specifically, the constricted part forming member 20V includes a plate member 40 (corresponding to the inner wall of the present invention) instead of the triangular ribs 18 of the above-described first embodiment. The plate member 40 has substantially the same shape as the vertical cross section 16A of the spiral flow path 16 and is fixed to the support frame 17. A circular center hole 40A is formed in the center of this plate member 40, with the above-described nozzles 22 being arranged in a central part of this center hole 40A. The configuration of this embodiment also provides the advantageous effects similar to those of the first embodiment.

Fifth Embodiment

Figure 7:
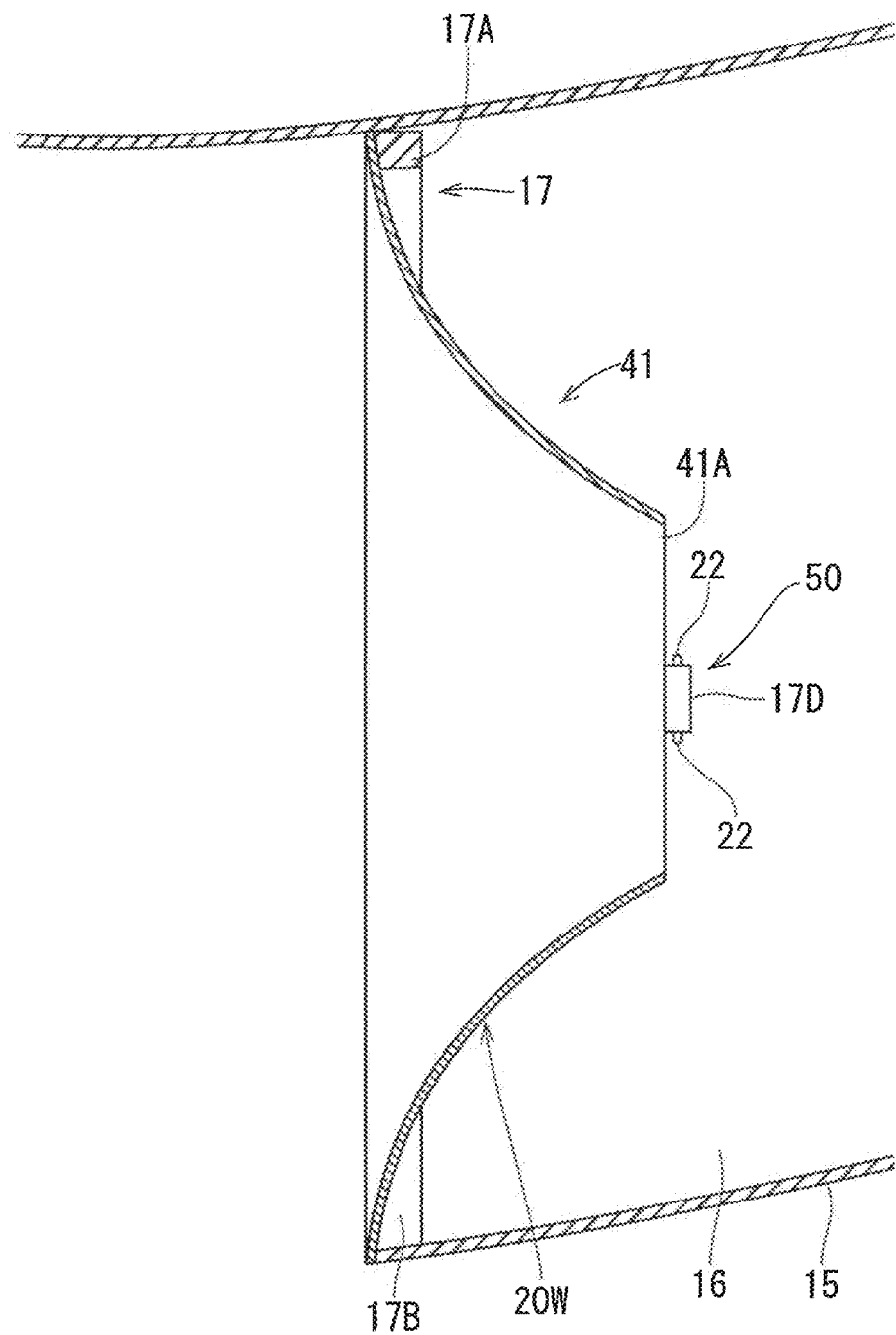
FIG. 7 is a side cross-sectional view of a constricted part forming member according to a fifth embodiment.

This embodiment is illustrated in FIG. 7, and different from the second embodiment in the configuration of the constricted part forming member 20W. More specifically, the constricted part forming member 20W includes a funnel member 41 (corresponding to the inner wall of the present invention) attached to the support frame 17 instead of the plate member 40 of the above-described fourth embodiment. This funnel member 41 is formed such that the plate member 40 of the fourth embodiment is curved into a funnel shape. A partition bar 17D is attached across the center hole 41A of the funnel member 41, with a plurality of nozzles 22 being provided to this partition bar 17D similarly to the above-described first embodiment. The configuration of this embodiment also provides the advantageous effects similar to those of the first and second embodiments.

Example

Tests were conducted as follows with a simulator.
A. Test Method (1) A model that is the cyclone dust collector 10 of the above-described first embodiment with all the nozzles 30 being removed was set as Example Product 1 of the present invention in the simulator.

(2) A model that is the cyclone dust collector 10 of the above-described first embodiment with the constricted part forming member 20, nozzles 22 of the nozzle assembly 50, and nozzle 30 behind the triangular ribs 18 being removed was set as Comparative Product 1 in the simulator. The remaining three nozzles 30 were placed at the starting point of the spiral flow path 16 where the nozzles 22 had been arranged, at a location 180° turn along the spiral flow path 16 from this starting point, and at a location 180° turn further from this position along the spiral flow path 16.

(3) Paint mist particles were set as Particulate 1, while water mist particles were set as Particulate 2, with their sizes and specific gravities specified as follows in the simulator:
Particulate 1: Diameter 30-40 [μm], Specific gravity 1
Particulate 2: Diameter 30-40 [μm], Specific gravity 1

Figure 8A:
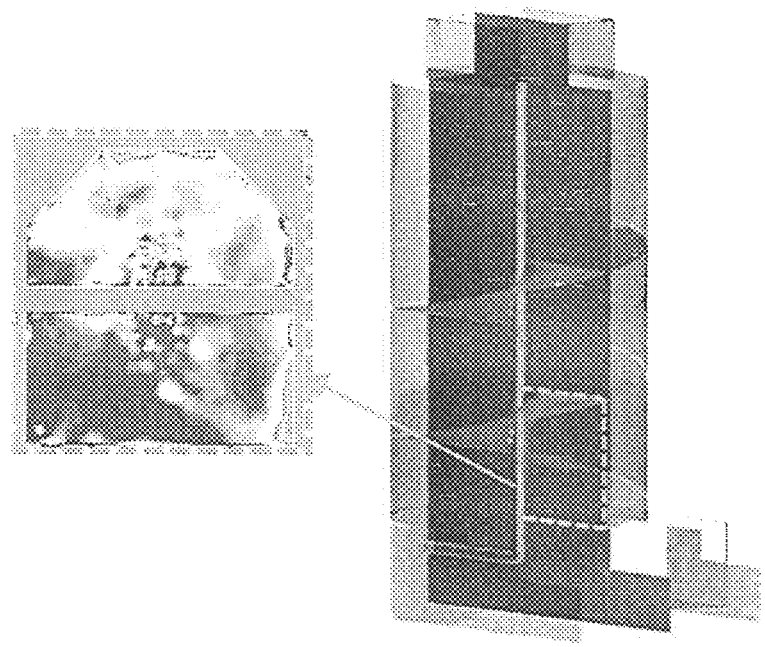
FIG. 8(A) is a first distribution diagram of particulate 1 and FIG. 8(B) is a second distribution diagram of particulate 2, according to Example Product 1.

(4) A first distribution diagram was obtained (FIG. 8(A)) as the distribution of Particulate 1 in a predetermined vertical cross section of the entire cylindrical case 12 under a condition where an air containing evenly distributed Particulate 1 flowed into Example Product 1 with a predetermined first velocity.

Figure 8B:
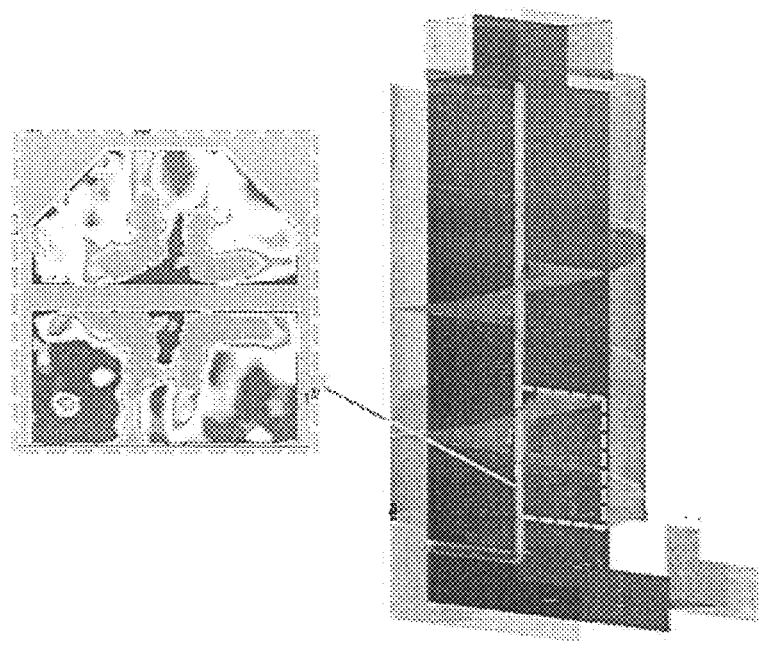

(5) A second distribution diagram was obtained (FIG. 8(B)) as the distribution of Particulate 2 in the predetermined vertical cross section of the entire cylindrical case 12 under a condition where, with an air that does not contain Particulate 1 flowing into Example Product 1 with the first velocity, Particulate 2 was sprayed from nozzles of Example Product 1.

(6) Based on the first distribution diagram and second distribution diagram, the proportion of the area of regions where the paint mist is present while the water mist is absent in the predetermined cross section of the entire cylindrical case 12 of Example Product 1 was determined as unmixed rate, and the mixing rate was obtained by subtracting this unmixed rate from 100%.

Figure 9:
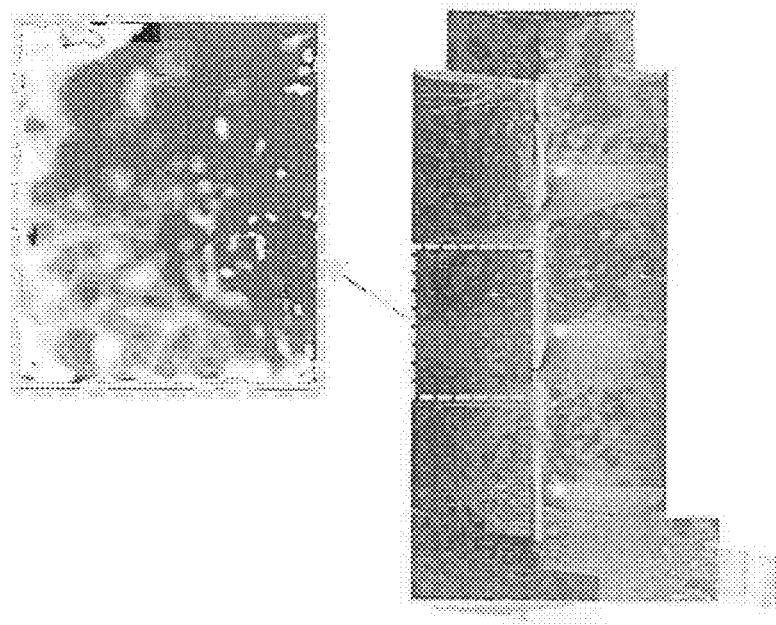
FIG. 9(A) is a first distribution diagram of particulate 1 and FIG. 9(B) is a second distribution diagram of particulate 2, according to Comparative Product 1.
Figure 9:
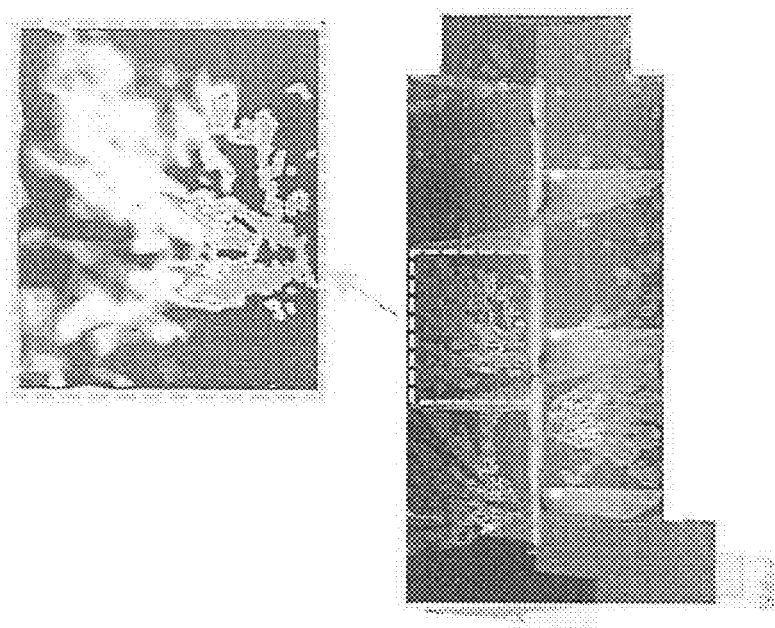

(7) Similarly, the first distribution diagram (FIG. 9(A)), second distribution diagram (FIG. 9(B)), and mixing rate were determined with respect to Comparative Product 1.

B. Test Results

The mixing rate of the paint mist and the water mist in Example Product 1 was 91.2[%], while the mixing rate of the paint mist and the water mist in Comparative Product 1 was 75.6[%]. This confirms that the mixing rate of the particles of paint mist contained in the air and particles of water mist is raised according to the present invention. As the mixing rate of the paint mist particles and the water mist particles is increased, both particles can readily join each other, so that it is assumed that the paint mist particle collection efficiency will be improved from before.

OTHER EMBODIMENTS

The present invention is not limited to the embodiments described above. Other embodiments, for example, such as those described below, are also included in the technical scope of the present invention. Further, the invention can be embodied with various changes other than those described below without departing from the scope of the subject matter.

(1) The cylindrical case 12 of the cyclone dust collector 10 of the above-described embodiments has a circular cross section, but it may have a polygonal or oval cross section.

(2) The cylindrical case 12 of the cyclone dust collector 10 of the above-described embodiments has a center axis J1 extending in the vertical direction, but the center axis may extend horizontally, or be inclined to the horizontal.

(3) While the intermediate bridge 17C of the first and second embodiments extends laterally, the intermediate bridge 17C may be configured to extend vertically and include a plurality of nozzles 22 on both lateral sides of the bridge.

(4) While the intermediate bridge 17C divides the vertical cross section 16A in two in the first and second embodiments described above, the intermediate bridge 17C may be configured to divide the vertical cross section 16A into three or more split regions, with the nozzles 22 spraying water mist to each of the split regions.

(5) While the intermediate bridge 17C is supported on both sides in the first and second embodiments described above, the intermediate bridge 17C may have a cantilevered structure. More specifically, for example, the water distribution pipe 14B may have a cantilevered branch pipe extending therefrom with the plurality of nozzles 22 provided on upper and lower faces of the branch pipe.

(6) To make the vertical cross section 16A of the spiral flow path 16 narrower, other than the structures of the embodiments described above, a rectangular plate member may be provided, for example, to cover about upper half or lower half of the vertical cross section 16A, or about half of the vertical cross section on one of the left and right sides.

(7) While the cyclone dust collector 10 of the embodiments described above is used for removing paint mist particles from air, the present invention may be applied to cyclone dust collectors that have other target particles to be removed than paint mist from air.

(8) While in the cyclone dust collector 10 of the above described embodiment, the triangular ribs 18 are arranged on the both corners on the upper side of the vertical cross section 16A, the triangular ribs may be arranged on any one, two, three, or all of the four corners of the vertical cross section.

(9) While in the cyclone dust collector 10 of the above described embodiment, the triangular ribs 18, the plate member 40, and the funnel member 41 may be fixed inside the cylindrical case 12 via the support frame 17, they may be directly fixed to the cylindrical case 12 by welding, bolts, and so on.

DESCRIPTION OF THE REFERENCE NUMERAL

10 Cyclone dust collector
12 Cylindrical case
14A Center pillar
15 Spiral guide
16 Spiral flow path
16A Vertical cross section (first cross section)
17C Intermediate bridge
17D Partition bar
19 Constricted part
22, 30 Nozzle
50, 50V, 50W, 50X Nozzle assembly
51A, 51B Split region
J1 Central axis

What is claimed is:

1. A cyclone dust collector that includes, inside a cylindrical case, a spiral flow path defined by a spiral guide and a nozzle that sprays water mist, to combine particles to be removed that are contained in an air passing through the spiral flow path with the water mist and to centrifugally collect the particles on an inner surface of the cylindrical case for recovery, the cyclone dust collector comprising:
    a nozzle assembly including a plurality of the nozzles arranged within a first cross section defined by a plane containing a center axis of the cylindrical case and part of the spiral flow path intersecting with each other, the nozzles being adapted to spray the water mist in a direction along the first cross section;
    a partition bar that partitions the first cross section into a plurality of split regions, wherein the plurality of nozzles of the nozzle assembly are attached to the partition bar to spray the water mist to each of the plurality of split regions; and
    a center pillar that extends along a central part of the cylindrical case, wherein:
        the partition bar extends between the center pillar and an inner side face of the cylindrical case, and
        the plurality of nozzles of the nozzle assembly are gathered at a substantially central position in a longitudinal direction of the partition bar to spray the water mist radially from the substantially central position.

2. The cyclone dust collector according to claim 1, wherein
    the nozzle assembly is arranged at an upstream end portion of the spiral flow path.

3. The cyclone dust collector according to claim 1, wherein
    all of the plurality of nozzles inside the cylindrical case are arranged closer to an upstream side of the spiral flow path.

4. The cyclone dust collector according to claim 2, wherein all of the plurality of nozzles inside the cylindrical case are arranged closer to an upstream side of the spiral flow path.

5. The cyclone dust collector according to claim 1, wherein
the cyclone dust collector includes an inner wall arranged on an edge portion of the first cross section and adapted to make the part of the flow path narrower, and the nozzle assembly is arranged in a constricted part of the part of the spiral flow path that is made narrower by the inner wall.

6. The cyclone dust collector according to claim 2, wherein
the cyclone dust collector includes an inner wall arranged on an edge portion of the first cross section and adapted to make the part of the flow path narrower, and the nozzle assembly is arranged in a constricted part of the part of the spiral flow path that is made narrower by the inner wall.

7. The cyclone dust collector according to claim 3, wherein
the cyclone dust collector includes an inner wall arranged on an edge portion of the first cross section and adapted to make the part of the flow path narrower, and the nozzle assembly is arranged in a constricted part of the part of the spiral flow path that is made narrower by the inner wall.

* * * * *